(12) United States Patent
Kang

(10) Patent No.: US 6,205,581 B1
(45) Date of Patent: Mar. 20, 2001

(54) METHOD FOR REPLACE-BLOCK LOADING IN A MULTIPROCESSOR SYSTEM

(75) Inventor: Sung-min Kang, Seoul (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 09/188,826

(22) Filed: Nov. 9, 1998

(30) Foreign Application Priority Data

Nov. 7, 1997 (KR) .................................................. 97-58857

(51) Int. Cl.$^7$ ..................................................... G06F 9/445

(52) U.S. Cl. ............................ 717/11; 455/420; 370/441; 370/342; 370/335; 713/100; 709/221

(58) Field of Search .................................... 455/418, 419, 455/420, 507, 560; 370/441, 320, 335, 342; 717/11; 709/221; 713/2, 100

(56) References Cited

U.S. PATENT DOCUMENTS

| | | | |
|---|---|---|---|
| 4,954,941 | 9/1990 | Redman | 717/11 |
| 5,148,524 | 9/1992 | Harlin et al. | 345/519 |
| 5,349,680 | * 9/1994 | Fukuoka | 709/108 |
| 5,410,703 | 4/1995 | Nilsson et al. | 717/11 |
| 5,682,533 | 10/1997 | Siljestroemer | 707/200 |
| 5,727,215 | 3/1998 | Rynaski et al. | 717/11 |
| 5,812,857 | * 9/1998 | Nelson et al. | 717/11 |
| 5,918,047 | * 6/1999 | Leavitt et al. | 713/2 |
| 5,958,080 | * 9/1999 | Kang | 714/807 |
| 5,974,312 | * 10/1999 | Hayes, Jr. et al. | 455/419 |
| 5,978,589 | * 11/1999 | Yoon | 717/11 |
| 6,074,435 | * 6/2000 | Rojest.ang.l | 717/11 |
| 6,128,776 | * 10/2000 | Kang | 717/11 |

FOREIGN PATENT DOCUMENTS

0030463A2 * 6/1981 (EP).

* cited by examiner

*Primary Examiner*—Mark R. Powell
*Assistant Examiner*—Tuan Q. Dam
(74) *Attorney, Agent, or Firm*—Dilworth & Barrese, LLP

(57) ABSTRACT

The present invention relates a method for replace-block loading using a man machine command and for processing a replace block loading (RPL-LDNG-BLK) command using a processor loader execution in a BTS control processor or selector interface processor. The method for replace-block loading in order to replace a target application block corresponding to a target processor during normal operation of all the processors in a base station controller (BSC) without disrupting the target processor in a personal communication services (PCS) system, includes the steps of: creating a loading table and allocating a save-buffer for application blocks corresponding to a plurality of processors in the BSC and a rpl-buffer for the target application block to be replaced corresponding to the target processor; down-loading an application block corresponding to a CCP from a BSM; loading an application block corresponding to lower-level processors of the CCP, the application block being stored in a buffer of the CCP; receiving a replace-loading-block (RPL-LDNG-BLK) command from the BSM; confirming the type of the target processor; and loading the target application block according to the type of the target processor. The method for processing a RPL-LDNG-BLK command using a PLX in order to normally operate at an initialization state in a PCS employing a CDMA method comprises the steps of: creating a loading table about application blocks corresponding to lower processors of either of the BCP or SIP; loading the lower application blocks from a CCP to the BCP or SIP and managing at the loading table information about loading.

26 Claims, 5 Drawing Sheets

METHOD FOR REPLACE-BLOCK LOADING IN A MULTIPROCESSOR SYSTEM

FIELD OF THE INVENTION

The invention generally relates to software upgrading in an operational system and more particularly relates to a method of replacement of an application block corresponding to a target processor in a multiprocessor personal communication services (PCS) system without interrupting system operational integrity.

DESCRIPTION OF THE RELATED ART

In a communication system, software which operates the system, often referred to as application blocks, needs to be updated to achieve enhanced operation. In order to maintain the integrity of the communication system, the application blocks to be updated need to be replaced with a new version without disturbing the normal operation of a processor containing the application block. Generally, the replacement of an application block proceeds in a manner where the target application block to be replaced is placed on a patch directory in a BSM and an upper processor and a target processor containing the target application block are reloaded in turn. This process is, however, ineffective because calls are often discontinued during replacement.

Several solutions have been proposed in the prior art for changing and updating software. FIG. 1 illustrates a typical hierarchal ranking structure of multiple processors of a PCS system. At the top of the ranking structure, is a base station manager (BSM) 300. Under the BSM, are a plurality of base station controllers (BSC) 100, 200. Each BSC includes a plurality of common signaling management processors (CMP) 110 and a plurality of call control processors (CCP) 120. The CCP 120 has a plurality of BTS control processors (BCP) 130, a plurality of selector interface processors (SIP) 140, a plurality of common signaling processors (CSP) 150 and a plurality of alarm control processors (ACP) 160. The BCP 130 further includes a plurality of transceiver interface processors (TIP) 170, a plurality of channel interface processors (CIP) 180 and a plurality of BTS test processors (BTP) 190. The SIP 140 has a plurality of selector and vocoder processors (SVP) 195.

In order to identify the target processor, a replace-loading-block (RPL-LDNG-BLK) command contains information about a target processor's type. Referring to the FIG. 1, the RPL-LDNG-BLK command is generally executed in turn on each level of the ranking structure.

For example, when a target application block corresponds to a CCP 120, a CSLX (CCP subsystem loader execution) receives a RPL-LDNG-BLK command and decides on replacing its own application block in response to analyzing information of the RPL-LDNG-BLK. Such a replacement is executed as follows.

Because an application block is executed from dynamic memory which is allocated by an operating system (OS) and the CSLX manages the identification of processors, the CSLX is capable to terminating execution of a target application block and freeing the memory containing the target application block using an OS primitive. The CSLX frees the corresponding memory and requests the BSM 300 to reload only the target application block. A section of dynamic memory is allocated and the target application block is loaded. The CSLX executes the application block using an OS primitive in response to successful loading.

When a target application block corresponds to a lower processors of the CCP 120, i.e. a processor beneath the CCP 120 in the hierarchal structure of FIG. 1, the replacement is executed as follows. As above, the CSLX frees the previously loaded memory in response to an RPL-LDNG-BLK command and requests loading of a target application block. The BSM loads the target application block to the CCP and the same command is sent to the lower processor. The lower processor is restarted in response to the RPL-LDNG-BLK command containing the same identification of the lower processor, i.e., when the lower processor is a target processor and application blocks corresponding to the lower processor are reloaded from the CCP 120 to the lower processor. When a processor under the lower processor is a target processor, the lower processor frees the previously loaded memory and requests loading of a target application block and is restarted to enable reloading.

U.S. Pat. No. 5,410,703 discloses a method for updating software in an operating computer system. The method of the '703 patent incudes the steps of: down-loading new software; copying data from the old software to be processed by the new software; testing the new software by processing the copied data; and either replacing the old software with the new software in response to its successfully processing or deleting the new data software in response to the new software failing to successfully process the data. Changing software in this manner takes place without disrupting system operation. However, the methods disclosed do not address problems encountered while changing software application programs remotely, such as restoring the old software application program in the event of abnormal loading resulting from communication errors.

As illustrated above, the prior art contains shortcomings associated with dynamic replacement of software, such as failure to restore the existing application block in the event of downloading failure. For example, a CSLX in a CCP 120 terminates the existing version of a target application block in response to a RPL-LDNG-BLK command indicating that the CCP 120 is a target processor in order to free dynamic memory. Then, while reloading of the target application block is requested, such an operation may fail for a variety of reasons. In this case, the CSLX fails to load in spite of continuous attempts to load and cannot restart the processor because the existing application block is already removed from memory and is not restored. This is the case with lower processors of the CCP 120. Because the existing application block is removed prior to loading of the target application block to the target processor, it is not possible to restore the existing application block in the event that new version of the target application block software is not properly loaded.

As described above, a crucial problem is that the existing application block is removed from the memory prior to normal execution of a replacement command and is not restored in spite of failing to properly load the new version.

Attempts have made to solve the problems associated with replacing application block software. Accordingly, an object of the present invention is to effect replacement of a target application block currently being executed in a target processor without disrupting the proper operation of the processor, even when the replacement is unsuccessful.

SUMMARY OF THE INVENTION

According to a preferred embodiment of the present invention, a method for replace-block loading in a personal communication services (PCS) system employing a code division multiple access (CDMA) in order to replace a target application block corresponding to a target processor during continuous operation of all the processors in a base station controller (BSC) without disrupting the target processor, the method comprises the steps of: creating a loading table and allocating a buffer for application blocks corresponding to all the processors in the BSC and a buffer for the target application block to be replaced corresponding to the target processor; down-loading an application block corresponding to a call control processor (CCP) from a base station manager (BSM); loading an application block corresponding to all lower-level processors of the CCP, the application block being stored in a buffer of the CCP; receiving a replace-loading-block (RPL-LDNG-BLK) command from the BSM; confirming a type of the target processor; loading the target application block corresponding to the target processor, in response to the target processor being confirmed as one of a selector and vocoder processor (SVP), a call interface processor (CIP), a transceiver interface processor (TIP) and a BTS test processor (BTP); loading the target application block corresponding to the target processor, in response to the target processor being confirmed as one of the BCP, the SIP, a common signaling processor (CSP) and an alarm control processor (ACP); and loading the application block corresponding to the CCP in response to the CCP being confirmed as the target processor for replacement.

A method for processing a RPL-LDNG-BLK command using a processor loader execution (PLX) in a BCP or SIP in order for a BTS control processor (BCP) or a selector interface processor (SIP) to normally operate at an initialization state in a personal communication services (PCS) system, the method includes steps of: creating a loading table about application blocks corresponding to lower processors of one of the BCP and SIP; and loading the lower application blocks from a CCP to the BCP or SIP and managing at the loading table information about loading.

The preferred embodiment of the present invention is described in detail in reference with the attached drawings below.

DETAILED DESCRIPTION OF THE PRESENT INVENTION

Figure 2:
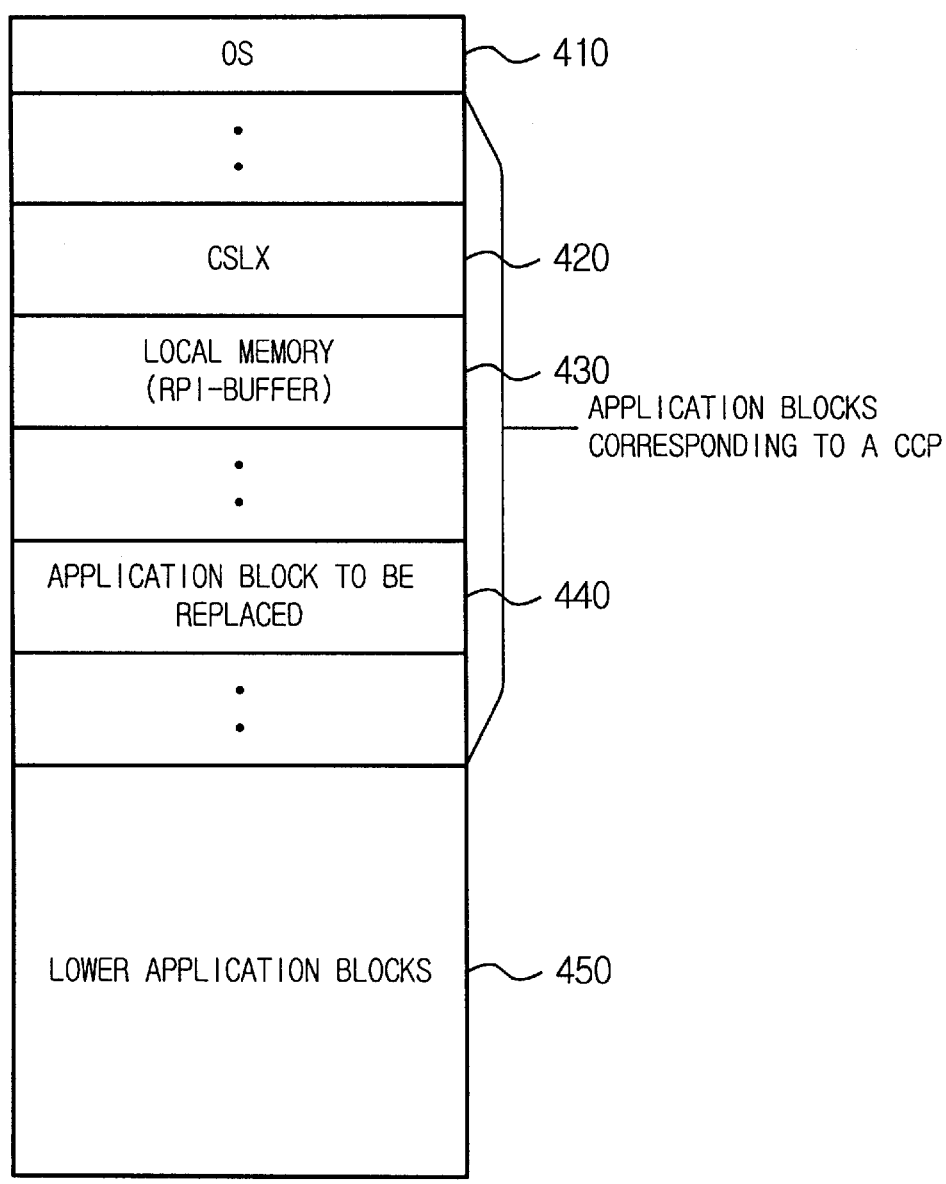
FIG. 2 is a memory map illustrating hierarchy of location of application blocks in memory of a CCP.

Referring to FIG. 2, there is disclosed a memory map illustrating a hierarchy of location of application blocks in memory of a CCP. The memory map includes several hierarchical areas. At the top of the hierarchy is an operating system (OS) area 410. Below this level is a first user area followed by the next lower level which is a CSLX area 420. Below the CSLX area is local memory 430 for replacement allocated by the CSLX and beneath this is a second user area. Below this level is an area for storing an application block to be replaced 440. At the lowest level in the hierarchy is an area for lower application blocks to be loaded to lower processors 450.

Figure 3A:
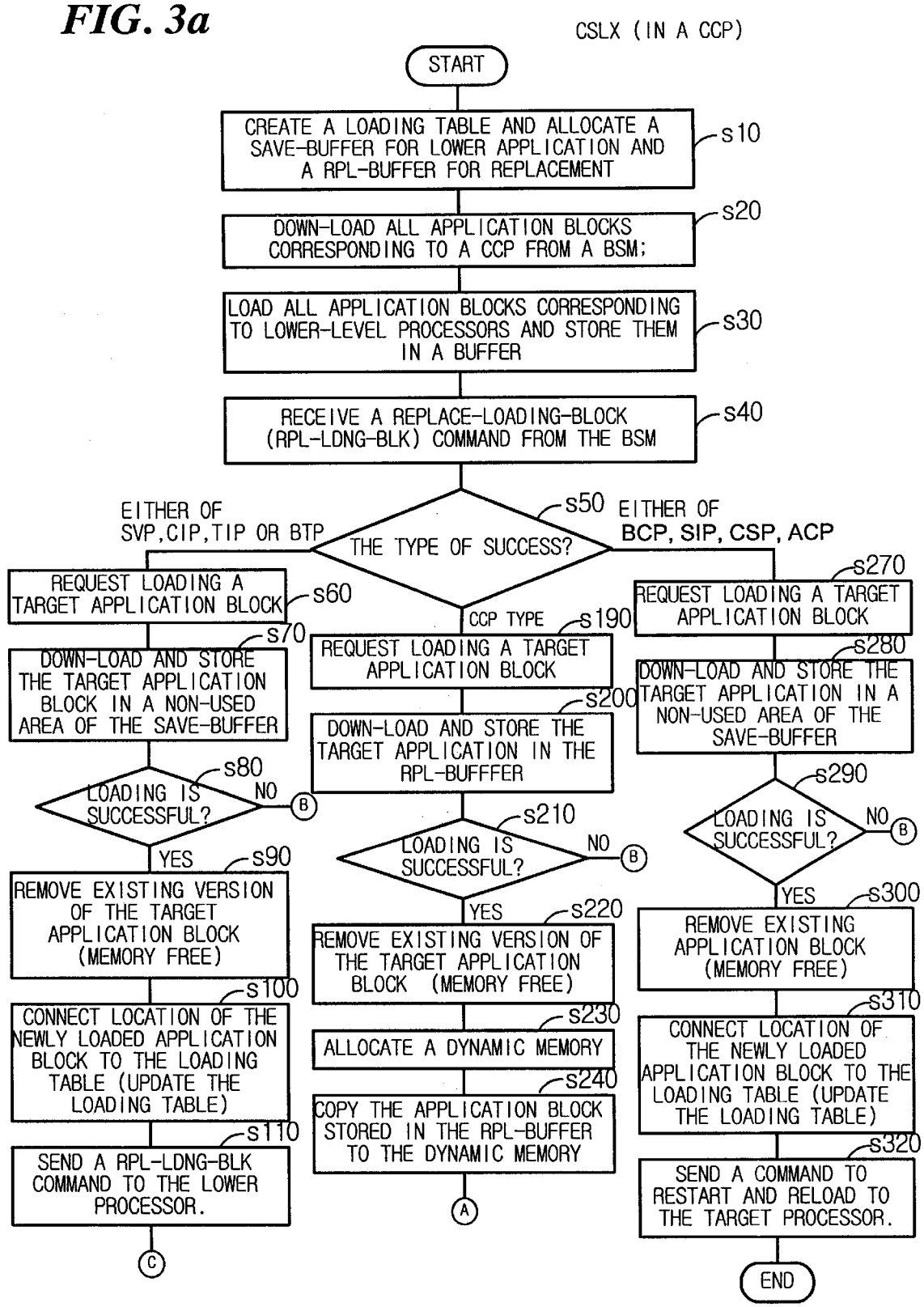
FIGS. 3A–3B are a flowchart illustrating the method for replace block loading using a MMC.
Figure 3B:
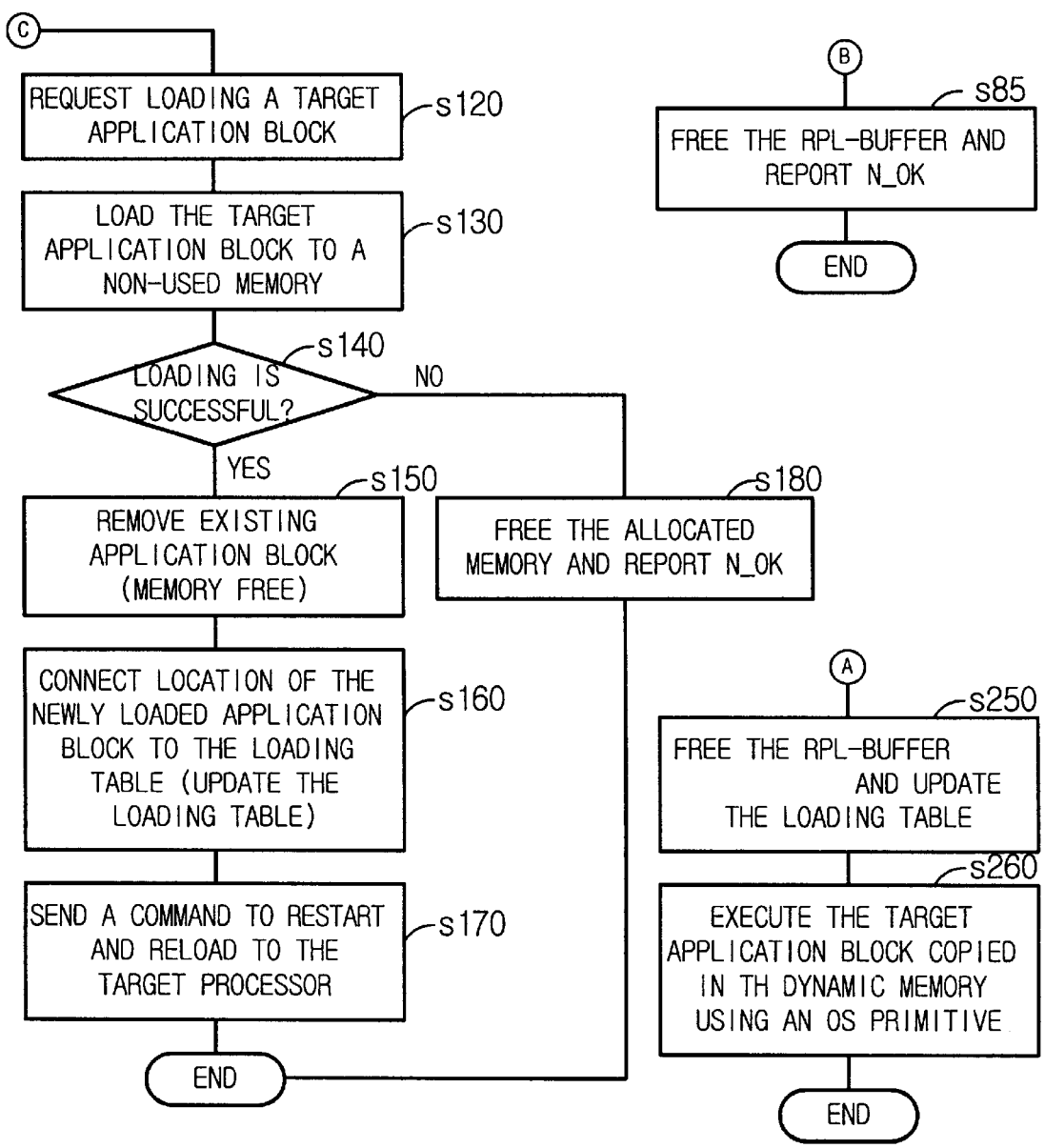
Figure 4:
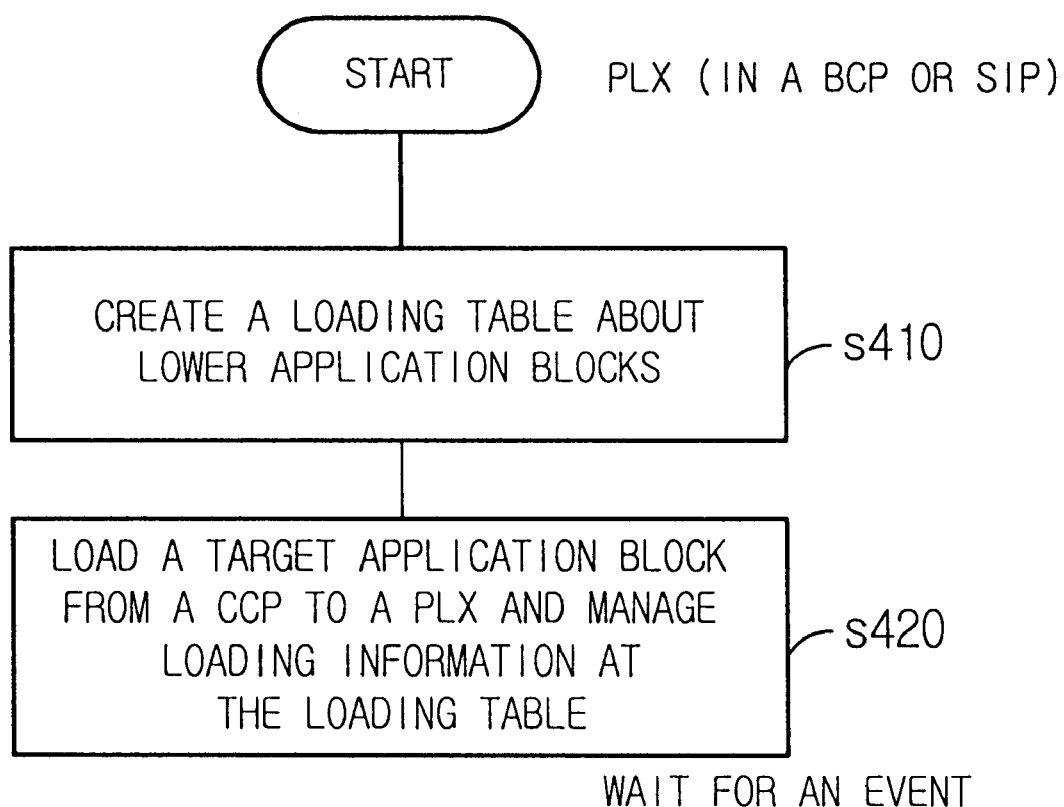
FIG. 4 is a flowchart illustrating the method that a PLX in a BCP or SIP processes a RPL-LDNG-BLK command.

FIGS. 3A–3B is a flowchart illustrating the method for replace-block loading using a MMC command. FIG. 4 is a flowchart illustrating the manner that a PLX located within a BCP and SIP processes an RPL-LDNG-BLK command.

Referring to FIG. 3A, a preferred method for replace-block loading using a man machine command (MMC) in a personal communication services (PCS) system employing code division multiple access (CDMA) is shown. The method effects the replacement of a target application block corresponding to a target processor during continuing operation of all the processors in a BSC 100, 200 without disrupting the target processor. The method includes the step of creating a loading table and allocating a buffer for application blocks corresponding to all the processors in the BSC and a buffer for the target application block to be replaced corresponding to the target processor (s10). After the buffer is allocated, down-loading of an application block corresponding to a CCP 120 from a BSM 300 (s20) can commence. This is followed by loading the application block corresponding to all lower-level processors 130, 140, 150, 160, 170, 180, 190, 195 of the CCP 120, the application block being stored in a buffer of the CCP 120 (s30). Upon receiving a RPL-LDNG-BLK command from the BSM 300 (s40), the type of the target processor is determined (s50). The loading process then continues along one of three paths depending on the processor type. For example, loading the target application block corresponding to the target processor (s60 to s80) in response to the target processor being confirmed as either of a TIP 170, a CIP 180, a BTP 190 or a SVP 195; loading the application block corresponding to the CCP 120 in response to the CCP 120 being confirmed as the target processor for replacement. (s190 to s210) and loading the target application block corresponding to the target processor, in response to the target processor being confirmed as either of a BCP 130, a SIP 140, a CSP 150 or an ACP 160 (s270 to s290).

When the target processor is identified as one of the TIP 170, CIP 180, BTP 190 or SVP 195, the target application block is loaded and stored in a non-used area of a save-buffer (s70). In the event that the downloading operation is unsuccessful (s80), the rpl-buffer is cleared and a result of N_OK is reported (s85). If the down loading operation is successful (s80), a memory freeing operation is performed to remove existing application blocks corresponding to the BCP 130 or SIP 140 (s90). The loading table is then updated by placing a location of the application blocks corresponding to the BCP 130 or SIP 140 and the target application block into the loading table (s100).

The CCP 120 then sends a RPL-LDNG-BLK command to the BCP 130 or SIP 140 (s110). In response, the BCP 130 or SIP 140 requests loading of the target application block (s120). A non-used area of memory is allocated and the target application is loaded to the non-used area of memory (s130). After the target application block is loaded, the method determines whether the loading operation was successful or not (s140). If loading was successful, a memory freeing operation is executed to remove the existing application block of the target processor stored in the memory (s150). The loading table is then updated by placing a location of the newly loaded target application block into the loading table (s160). The target processor is then reset and reloading of the new application block is executed (s170).

If in step s140, it is determined that the loading operation was unsuccessful, the memory allocated for the replacement application block is cleared and a not OK (N_OK) condition is reported (s180).

Returning to step s50, if the target processor is identified as a CCP 120, the target application block is requested (s190) and then loaded and stored in a rpl-buffer (s200). If the downloading operation is successful (s210), a memory freeing operation is performed to remove the existing version of the target application block from the target processor (s220). A portion of dynamic memory is then allocated in accordance with information in the loading table (s230) and the newly loaded target application block, stored in the rpl-buffer, is then copied to the dynamic memory (s240). The rpl-buffer allocated for replacement is then cleared and the loading table is updated (s250). The target application block, copied in the dynamic memory, is then executed by using the OS primitive (s260).

In the event that the downloading operation is unsuccessful (s210), the rpl-buffer is cleared and a result of N_OK is reported (s85).

In response to the target processor being confirmed as either of a BCP 130, SIP 140, CSP 150 or ACP 160, the target application block is loaded and stored in a non-used area of the save-buffer (s280). The loading operation is tested to determine if this operation was successful (s290). If the downloading operation is successful, a memory freeing operation is performed to remove the existing version of the target application block from the target processor (s300). The loading table is then updated by placing the location of the newly loaded target application block into the loading table (s310). The target processor is then restarted and the application block is reloaded (s320).

Returning to step s290, if the downloading operation is unsuccessful for any reason, the rpl-buffer is cleared and the N_OK message is reported (s85).

Target application blocks to be loaded are preferably stored in a directory structure. For example, a directory /home/secbsm/pgm is a directory name where original programs are stored and /home/secbsm/pgm-patch is a temporary directory where the modified programs are temporarily stored. By storing the modified programs in a separate, temporary file directory, the integrity of the original programs is not disrupted. A SLX (system loader) of a BSM 300 which requests to load an application block from a CCP 120 first searches for a target application block in the directory of /home/secbsm/pgm-patch to determine if a modified program is available for loading. If not, the SLX will then search in the /home/secbsm/pgm directory for the desired application block.

Figure 1:
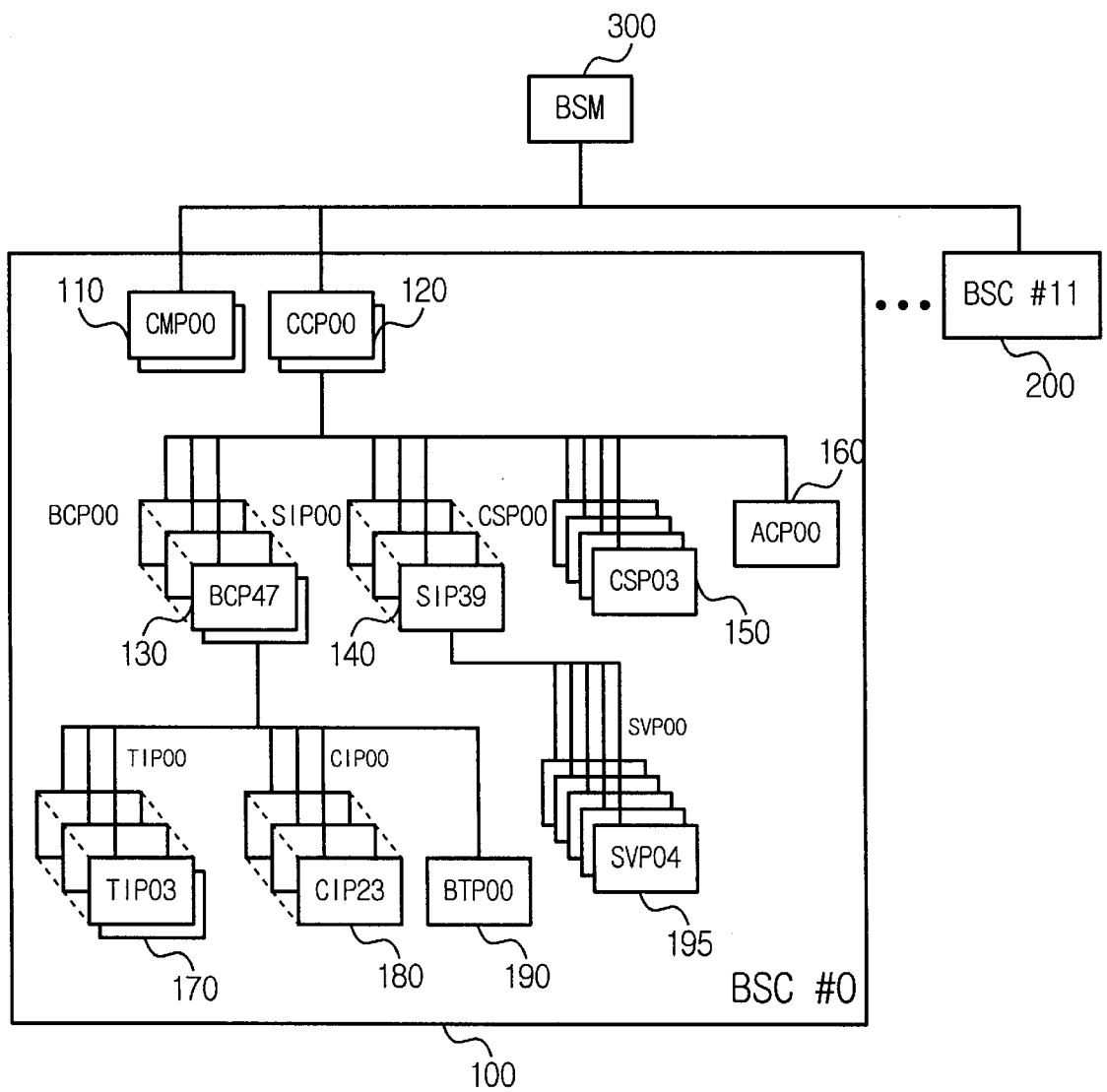
FIG. 1 illustrates a ranking structure of processors of a PCS system.

The RPL-LDNG-BLK command as shown in FIG. 1 is executed level by level in each level of the hierarchal processing structure. For example, the RPL-LDNG-BLK command to replace an application block corresponding to a CIP 180 is executed as follows. A target application block is received directly from the BSM 300. The target application block is replaced firstly in a CCP 120 and secondly in a BCP 130. After replacing the application block in two upper processors, the target processor, CIP 180, is restarted and the new application block is loaded from the BCP 130 to the CIP 180.

According to one preferred embodiment of the present invention, a method for processing a RPL-LDNG-BLK command using a Processor Loader Execution (PLX) in a BCP 130 or in a SIP 140 in order for the BCP 130 or SIP 140 to normally function at an initialization state in a PCS employing CDMA includes the steps of: creating a loading table about application blocks corresponding to lower processors of either of the BCP or SIP s410; loading the lower application blocks from a CCP 120 to the BCP 130 or SIP 140 and managing information about loading at the loading table s420.

As stated above, a CSLX in a CCP 120 loads application blocks corresponding to the CCP and lower processors and manages information about each application block using a loading table. The application block of the CCP is loaded to a dynamic memory managed by an OS and application blocks corresponding to lower processors are stored in a local buffer allocated by the CSLX.

A PLX in a BCP 130 or SIP 140 loads lower application blocks to a portion of memory allocated by the OS and manages information regarding loading using a loading table.

When a loading process is not successfully completed because of problems such as communication errors, the target processor doesn't need to be restarted, because the existing application block is not removed. Therefore, the target processor remains running in a normal operation.

While the invention is susceptible to various modification and alternative forms, specific embodiments thereof have been shown by way of example in the drawings and detected description. It should be understood, however, that the present invention is not limited to the particular forms disclosed, but on the contrary, the intention is to cover all modifications, equivalents, and alternative falling within the spirit and scope of the invention as defined by the appended claims.

What is claimed is:

1. A method for replace-block loading in a personal communication services (PCS) system in order to replace a target application block corresponding to a target processor during normal operation of a plurality of processors in a base station controller (BSC) the method comprising the steps of:

creating a loading table and allocating a save-buffer for application blocks corresponding to the plurality of processors in said BSC and a replace buffer (rpl-buffer) for said target application block to be replaced corresponding to said target processor;

down-loading an application block corresponding to a call control processor (CCP) from a base station manager (BSM);

loading an application block corresponding to all lower-level processors of said CCP, said application block being stored in a buffer of said CCP;

receiving a replace-loading-block (RPL-LDNG-BLK) command from said BSM;

confirming the type of said target processor; and loading said target application block according to the type of said target processor.

2. A method for replace-block loading as set forth in claim 1, further comprising a step, in response to said target processor being confirmed as either of said SVP, CIP, TIP or BTP, of loading and storing said target application block in a non-used area of said save-buffer.

3. A method for replace-block loading as set forth in claim 2, further comprising a step of memory freeing for removing existing version of said target application block in response to successful loading of said target application block.

4. A method for replace-block loading as set forth in claim 3, further comprising a step of updating said loading table by providing the location of said target application block to said loading table.

5. A method for replace-block loading as set forth in claim 4, further comprising a step of sending an RPL-LDNG-BLK command from one of said BCP or SIP to said target processor.

6. A method for replace-block loading as set forth in claim 5, further comprising a step of requesting to load said target application block from said target processor.

7. A method for replace-block loading as set forth in claim 6, further comprising a step of loading said target application block to a non-used memory allocated for replacement.

8. A method for replace-block loading as set forth in claim 7, further comprising a step of confirming whether loading of said target application block is successfully completed.

9. A method for replace-block loading as set forth in claim 8, further comprising a step of memory freeing for removing an existing application block of said target processor stored in response to successful loading of said target application block.

10. A method for replace-block loading as set forth in claim 9, further comprising a step of updating said loading table by providing the location of said newly loaded target application block to said loading table.

11. A method for replace-block loading as set forth in claim 10, further comprising a step of restarting said target processor and causing reloading.

12. A method for replace-block loading as set forth in claim 8, further comprising a step of clearing a memory allocated for replacement and reporting N_OK on said RPL-LDNG-BLK, if said target application block fails in loading.

13. A method for replace-block loading as set forth in claim 2, further comprising a step of freeing said rpl-buffer allocated for replacement and reporting N_OK on said RPL-LDNG-BLK, if said target application block fails in loading.

14. A method for replace-block loading as set forth in claim 1, further comprising a step of loading and storing said target application block in said rpl-buffer in response to said target processor being confirmed as a CCP.

15. A method for replace-block loading as set forth in claim 14, further comprising a step of memory freeing for removing an existing version of said target application block being executed in response to successful loading of said target application.

16. A method for replace-block loading as set forth in claim 15, further comprising a step of allocating a dynamic memory in accordance with information contained in said loading table.

17. A method for replace-block loading as set forth in claim 16, further comprising a step of copying said target application block stored in said rpl-buffer to said dynamic memory.

18. A method for replace-block loading as set forth in claim 17, further comprising a step of freeing said rpl-buffer allocated for replacement and updating said loading table.

19. A method for replace-block loading as set forth in claim 18, further comprising a step of executing said copied target application block in said dynamic memory by using an OS primitive.

20. A method for replace-block loading as set forth in claim 14, further comprising a step of freeing said rpl-buffer and reporting N_OK, if said target application block fails in being loaded.

21. A method for replace-block loading as set forth in claim 1, further comprising a step, in response to said target processor being confirmed as either of said BCP, SIP, CSP or ACP, of loading and storing said target application block in a non-used area of said save-buffer.

22. A method for replace-block loading as set forth in claim 21, further comprising a step of memory freeing for removing an existing application block in response to successful loading of said target application block.

23. A method for replace-block loading as set forth in claim 22, further comprising a step of updating said loading table by providing the location of said newly loaded target application block to said loading table.

24. A method for replace-block loading as set forth in claim 23, further comprising a step of restarting said target processor and reloading said application block.

25. A method for replace-block loading as set forth in claim 21, further comprising a step of clearing said rpl-buffer allocated for replacement and reporting N_OK on said RPL-LDNG-BLK, if said target application block fails in loading.

26. A method for processing a RPL-LDNG-BLK command using a processor loader execution (PLX) in a BTS control processor (BCP) or selector interface processor (SIP) in order for a BCP or a SIP to normally operate at an initialization state in a personal communication services (PCS) employing a code division multiple access (CDMA), said method comprising the steps of:

creating a loading table about application blocks corresponding to lower processors of one of said BCP and SIP; and loading said lower application blocks from a CCP to one of said BCP and SIP and managing at said loading table information about loading.

* * * * *